(12) United States Patent
Kulkarni et al.

(10) Patent No.: US 11,511,880 B2
(45) Date of Patent: Nov. 29, 2022

(54) STRUCTURALLY EMBEDDED LIGHTING FOR DISPLAY PANELS

(71) Applicant: The Boeing Company, Chicago, IL (US)

(72) Inventors: Abhishek Pradeep Kulkarni, Seattle, WA (US); John Christopher Wilde, Mill Creek, WA (US); Xiaoxi Wang, Mukilteo, WA (US); Nathanial C. Cuddy, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 494 days.

(21) Appl. No.: 16/160,471

(22) Filed: Oct. 15, 2018

(65) Prior Publication Data

US 2019/0084689 A1    Mar. 21, 2019

Related U.S. Application Data

(62) Division of application No. 14/707,652, filed on May 8, 2015, now Pat. No. 10,099,800.

(51) Int. Cl.
  *B64D 45/00* (2006.01)
  *G09F 13/00* (2006.01)
  (Continued)

(52) U.S. Cl.
  CPC ............ *B64D 45/00* (2013.01); *B29C 70/885* (2013.01); *B32B 1/00* (2013.01); *B60K 35/00* (2013.01);
  (Continued)

(58) Field of Classification Search
  CPC ............ H05B 33/10; G09F 2013/0436; G09F 2013/044; G09F 2013/0459;
  (Continued)

(56) References Cited

U.S. PATENT DOCUMENTS 4,788,629 A * 11/1988 Handy .................... G09F 13/22
                                                 362/23.01
4,819,276 A    4/1989 Stevens
(Continued)

FOREIGN PATENT DOCUMENTS

DE    102014011170 A1    2/2016
JP    2011192564 A    9/2011
(Continued)

OTHER PUBLICATIONS

DE 10 201401170.9 Foreign Priority of Staudigel et al. US PGPub 2016/0031368 A1, filed Jul. 24, 2014. (Year: 2014).*
(Continued)

*Primary Examiner* — Rajarshi Chakraborty
*Assistant Examiner* — Steven Y Horikoshi
(74) *Attorney, Agent, or Firm* — Yee & Associates, P.C.

(57) ABSTRACT

An embedded light source in a composite panel. A first electrode and a second electrode are associated with a first layer of material. A light source is positioned in electrical communication with the first electrode and the second electrode. An assembly comprising the first layer of material, the first electrode, the second electrode, and the light source is processed to form a multilayer panel with an embedded light source.

21 Claims, 12 Drawing Sheets

(51) Int. Cl.
  *B60Q 3/54*   (2017.01)
  *B29C 70/88*  (2006.01)
  *B60K 35/00*  (2006.01)
  *B32B 1/00*   (2006.01)
  *F21K 9/90*   (2016.01)

(52) U.S. Cl.
  CPC .............. *F21K 9/90* (2013.01); *G09F 13/00* (2013.01); *B60K 2370/34* (2019.05); *B60Q 3/54* (2017.02); *B64D 2045/007* (2013.01); *Y02T 50/40* (2013.01)

(58) Field of Classification Search
  CPC ..... G09F 2013/0468; G09F 2013/0481; G09F 2013/222–227; G09F 13/04; G09F 13/22; F21K 9/90; B60Q 3/14; B60Q 3/20; B60Q 3/41–47; B60Q 3/51; B60Q 3/53; B60Q 3/54; B60Q 3/745; B60Q 2500/10; B64D 2045/007; B64D 47/02; B64D 2011/0038; B29C 70/885; B60R 13/0212; B60R 2013/0287
  See application file for complete search history.

(56) References Cited

U.S. PATENT DOCUMENTS

| | | | | |
|---|---|---|---|---|
| 6,054,809 | A * | 4/2000 | Haynes | H01L 51/5203 313/505 |
| 6,465,951 | B1 * | 10/2002 | Krafcik | B29C 43/10 313/502 |
| 6,672,738 | B1 * | 1/2004 | Lewis | A47G 33/06 315/185 S |
| 7,391,622 | B2 | 6/2008 | Marshall et al. | |
| 7,567,186 | B2 | 7/2009 | Endress et al. | |
| 7,857,484 | B2 | 12/2010 | Marshall et al. | |
| 7,896,530 | B2 | 3/2011 | Budinger et al. | |
| 8,033,684 | B2 | 10/2011 | Marshall et al. | |
| 8,932,905 | B1 | 1/2015 | Safai | |
| 2001/0053071 | A1 * | 12/2001 | Yoda | G09F 13/08 362/23.07 |
| 2003/0027369 | A1 * | 2/2003 | Yamazaki | H01L 51/0097 438/21 |
| 2003/0038292 | A1 * | 2/2003 | Wang | H01L 33/486 257/730 |
| 2004/0211966 | A1 * | 10/2004 | Guenther | H01L 51/5253 257/79 |
| 2005/0008894 | A1 * | 1/2005 | Hiruma | H01L 51/0021 428/690 |
| 2005/0248268 | A1 | 11/2005 | Hardinger et al. | |
| 2005/0248935 | A1 * | 11/2005 | Strip | H01L 51/5203 362/145 |
| 2006/0202617 | A1 * | 9/2006 | Yamada | H01L 51/525 313/512 |
| 2007/0029548 | A1 * | 2/2007 | Yamazaki | H01L 27/3258 257/40 |
| 2007/0298663 | A1 | 12/2007 | Marshall et al. | |
| 2008/0123334 | A1 * | 5/2008 | Hochstein | G09F 9/33 362/249.01 |
| 2008/0211652 | A1 * | 9/2008 | Cope | B60K 35/00 340/461 |
| 2009/0103288 | A1 * | 4/2009 | Boyer | F21V 7/04 362/153.1 |
| 2009/0246502 | A1 * | 10/2009 | Hoetzeldt | B32B 5/26 428/304.4 |
| 2010/0014009 | A1 * | 1/2010 | Stavaeus | B64D 11/0015 348/837 |
| 2010/0061093 | A1 * | 3/2010 | Janssen | F21K 9/00 216/13 |
| 2010/0176410 | A1 * | 7/2010 | Furuyama | H01L 33/46 257/98 |
| 2010/0270571 | A1 * | 10/2010 | Seo | H01L 23/49537 257/98 |
| 2010/0327737 | A1 | 12/2010 | Hayashi et al. | |
| 2011/0163697 | A1 | 7/2011 | Mizukami et al. | |
| 2011/0279741 | A1 | 11/2011 | Smallhorn | |
| 2011/0302616 | A1 | 12/2011 | Mizukami et al. | |
| 2012/0043888 | A1 * | 2/2012 | Salter | B60Q 3/80 315/77 |
| 2012/0051067 | A1 * | 3/2012 | Murray | G09F 13/22 362/311.02 |
| 2012/0063154 | A1 * | 3/2012 | Cannon | B60Q 3/64 362/490 |
| 2012/0176776 | A1 * | 7/2012 | Van Herpen | F21V 31/00 362/147 |
| 2013/0181237 | A1 | 7/2013 | Hodrinsky et al. | |
| 2013/0193457 | A1 * | 8/2013 | Shimasaki | F21V 19/0045 257/88 |
| 2014/0115764 | A1 | 5/2014 | Cheng et al. | |
| 2014/0292026 | A1 | 10/2014 | Salvaggio, Jr. | |
| 2014/0362574 | A1 * | 12/2014 | Barrett | F21S 4/28 362/249.03 |
| 2015/0042494 | A1 | 2/2015 | Garrettson | |
| 2015/0165965 | A1 * | 6/2015 | Masaki | B32B 17/10532 362/513 |
| 2016/0031368 | A1 * | 2/2016 | Staudigel | B60Q 3/745 362/471 |
| 2016/0376024 | A1 | 12/2016 | Kulkarni et al. | |

FOREIGN PATENT DOCUMENTS

| | | |
|---|---|---|
| JP | 2012102842 A | 5/2012 |
| WO | WO2013148848 A1 | 10/2013 |
| WO | WO2014036217 A2 | 3/2014 |
| WO | 2014207635 A1 | 12/2014 |

OTHER PUBLICATIONS

Machine translation of DE 10 201401170.9, retrieved Jan. 12, 2021. (Year: 2020).*
Extended European Search Report, dated Nov. 8, 2016, regarding Application No. EP16166352.1, 8 pages.
Office Action, dated Aug. 2, 2017, regarding U.S. Appl. No. 14/707,652, 22 pages.
Notice of Allowance, dated May 18, 2018, regarding U.S. Appl. No. 14/707,652, 7 pages.
European Patent Office Communication, dated Apr. 3, 2020, regarding Application No. 17186698.1, 4 pages.
Japanese Patent Office, Notice of Reasons for Rejection, dated Apr. 14, 2020, regarding Application No. 2016085787, 14 pages.
Japanese Patent Office, Notice of Reasons for Rejection, dated Nov. 4, 2020, regarding Application No. 2016085787, 4 pages.

* cited by examiner

FIG. 2

STRUCTURALLY EMBEDDED LIGHTING FOR DISPLAY PANELS

CROSS-REFERENCE TO RELATED APPLICATION(S)

This application is a divisional of U.S. patent application Ser. No. 14/707,652, filed May 8, 2015, now U.S. Pat. No. 10,099,800, the disclosure of which is incorporated by reference herein in its entirety.

BACKGROUND INFORMATION

1. Field

The present disclosure relates generally to interior lighting and display panels. More particularly, the present disclosure relates to composite interior panels. The present disclosure relates still more particularly to methods and apparatuses for embedding a light source in a composite panel.

2. Background

Commercial airlines typically provide in-flight entertainment, safety notices, and other valuable information in the passenger cabin using static or programmable displays. Conventional static and programmable displays may include retractable display screens, passenger service units, display screens mounted in seat backs, or permanent placards. Static displays may only display a single image. As an example, a conventional backlit fasten seat belt sign in a commercial aircraft may be considered a static display. Programmable displays may be used to display a variety of images. For example, a retractable display screen in an aircraft that displays safety videos and in-flight entertainment may be considered a programmable display.

Conventional static and programmable displays on commercial aircraft may be undesirable in at least one of weight, bulk, number, efficiency, or connection complexity. For example, connecting a fasten seat belt sign may add manufacturing steps and time. Also, the fasten seat belt sign assembly may add weight to the aircraft. Connections and wiring for the fasten seat belt sign may also be more complex or heavier than desired. The bulk of a fasten seat belt sign assembly may be undesirable and may use additional fastening means for securing the fasten seat belt sign assembly.

Seat labeling and other location-flexible placards are currently not illuminated. It may be difficult to view the content of the placards under some lighting conditions or for some passengers.

Therefore, it would be desirable to have a method and apparatus that take into account at least some of the issues discussed above, as well as other possible issues. One issue may be to reduce the bulk or weight of a display. Another issue may be to reduce or eliminate additional manufacturing steps for installing displays. A further issue may be to provide a cost efficient and weight efficient method of providing illuminated placards for conventionally non-illuminated placards.

SUMMARY

An illustrative example of the present disclosure provides a method. A first electrode and a second electrode are associated with a first layer of material. A light source is positioned in electrical communication with the first electrode and the second electrode. An assembly comprising the first layer of material, the first electrode, the second electrode, and the light source is processed to form a multilayer panel with an embedded light source.

Another illustrative example of the present disclosure provides a multilayer panel with an embedded light source. The multilayer panel comprises a first electrode, a second electrode, a light source, and a second layer of material. The first electrode is associated with a first layer of material. The second electrode is associated with the first layer of material. The light source is in electrical communication with the first electrode and the second electrode. The second layer of material is overlying the first layer of material and the light source.

A further illustrative example of the present disclosure provides an aircraft. The aircraft comprises a multilayer panel with an embedded light source and a controller. The multilayer panel comprises a first electrode associated with a first layer of material, a second electrode associated with the first layer of material, a light source in electrical communication with the first electrode and the second electrode, and a second layer of material overlying the first layer of material and the light source. The controller is in communication with the light source.

A yet further illustrative example of the present disclosure provides a multilayer panel with an embedded light source. The multilayer panel with the embedded light source comprises a first layer of composite material, a light source, and a second layer of composite material. The light source is positioned relative to the first layer of composite material. The second layer of composite material overlies the first layer of composite material and the light source.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

FIG. 2 is an illustration of a block diagram of a manufacturing environment in accordance with an illustrative example;

DETAILED DESCRIPTION

Figure 1:
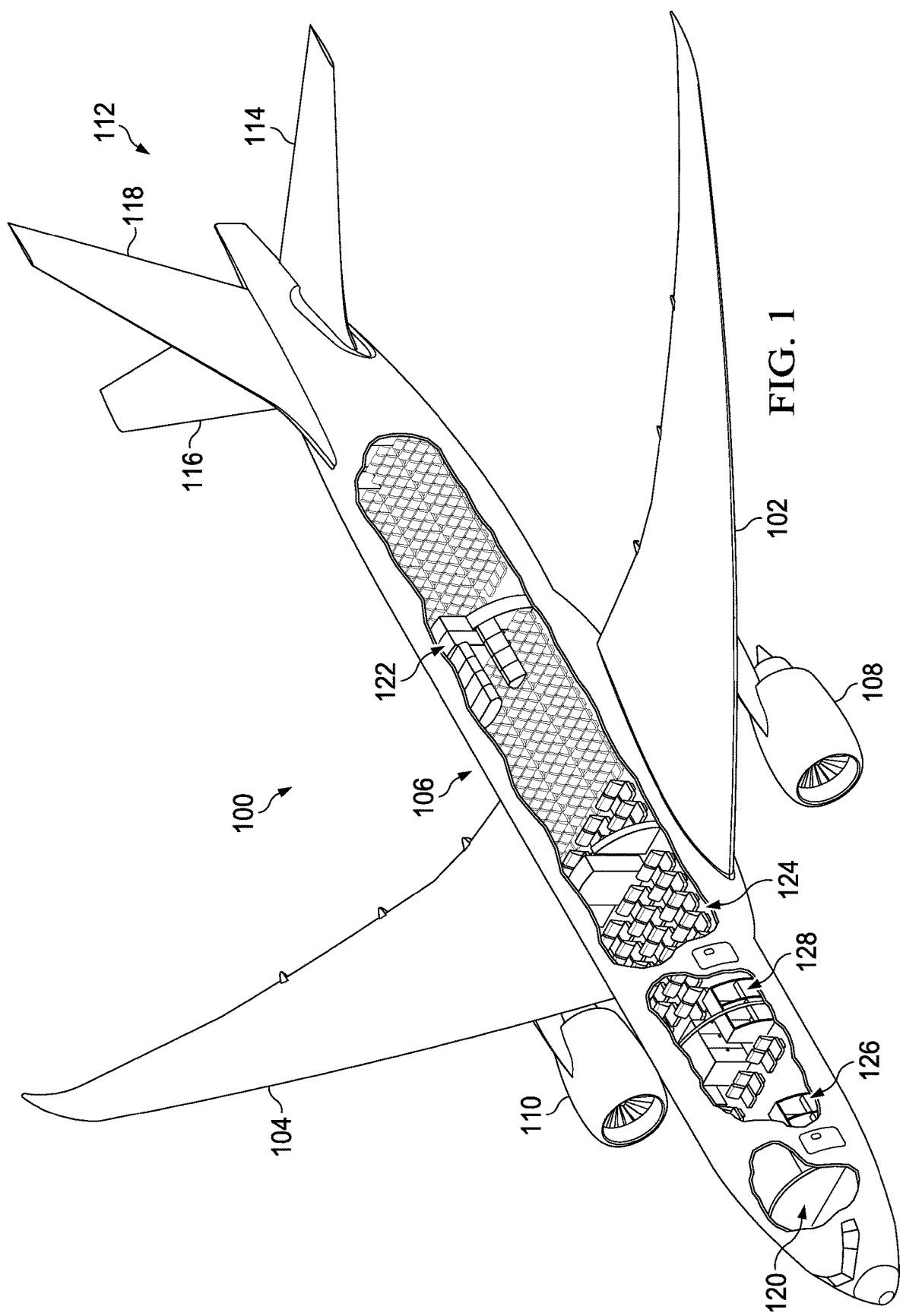
FIG. 1 is an illustration of an aircraft in accordance with an illustrative example.

With reference now to the figures, and in particular, with reference to FIG. 1, an illustration of an aircraft is depicted in accordance with an illustrative example. In this illustrative example, aircraft 100 has wing 102 and wing 104 attached to body 106. Body 106 may also be referred to as a fuselage. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106. Body 106 also has cockpit 120 and passenger cabin 122. In this example, passenger cabin 122 may include passenger seating in seating area 124. Passenger seating may include a number of aircraft seats. As used herein, a "number of" items means one or more items. For example, a number of aircraft seats means one or more aircraft seats.

Further, seating area 124 in passenger cabin 122 may also include storage areas, such as a number of overhead stowage bins. Passenger cabin 122 also may include lavatory 126 and galley area 128. These two areas may be partitioned or separated from seating area 124 by a partitioning structure such as, for example, without limitation, a wall, a partition, a class divider, a lavatory, a galley, a curtain, a stair enclosure, or a bar unit.

Also, other areas may be present in addition to seating area 124, lavatory 126, and galley area 128. Other areas may include, for example, without limitation, closets, storage areas, lounges, and other suitable areas for passenger seating. As another example, airplane seats within seating area 124 may be arranged differently from the depicted example. In other illustrative examples, some seats may be grouped into sets of single seats instead of three seats or pairs of seats as is illustrated in seating area 124.

Aircraft 100 is an example of an aircraft having components which may be manufactured in accordance with an illustrative example. For example, passenger cabin 122 of body 106 of aircraft 100 may include embedded light sources in composite panels. As one example, an embedded light source in a composite panel inside body 106 of aircraft 100 may include at least one of cabin lighting, décor, advertising, emergency signage, emergency lighting, entertainment displays, seat placards, safety signage, or another desirable type of display. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

Figure 14:
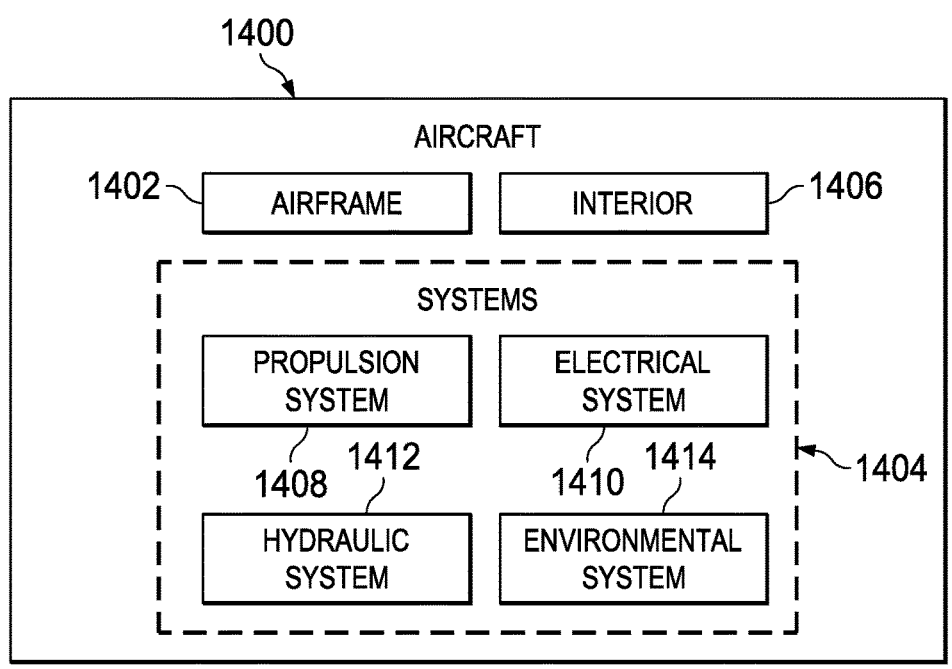
FIG. 14 is an illustration of a block diagram of an aircraft in which an illustrative example may be implemented.

This illustration of aircraft 100 is provided for purposes of illustrating one environment in which the different illustrative examples may be implemented. The illustration of aircraft 100 in FIG. 1 is not meant to imply architectural limitations as to the manner in which different illustrative examples may be implemented. For example, aircraft 100 is shown as a commercial passenger aircraft. The different illustrative examples may be applied to other types of aircraft, such as a private passenger aircraft, a military aircraft, a rotorcraft, and other suitable types of aircraft. For example, an illustration of a block diagram of aircraft 1400 is depicted in FIG. 14.

Although the illustrative examples for an illustrative example are described with respect to an aircraft, the illustrative example may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, and other suitable platforms.

In some illustrative examples, stationary platform may include any type of desirable building. For example, a stationary platform may take the form of a school, a hospital, a museum, an exhibition hall, or any other desirable type of building. For example, an embedded light source in a composite panel may be used for a display or lighting. When not in use, the embedded light source may not be detectable. As a result, an embedded light source in a composite panel may be used to form walls, ceilings, partitions, or any desirable portion of a building.

The embedded light source in a composite panel may be manufactured as an original component of a platform. In some illustrative examples, the composite panel may be a replacement or retrofitted component of a platform. For example, a composite panel in aircraft 100 without an embedded light source may be replaced with an embedded light source in a composite panel. In some illustrative examples, all or a portion of a wall of a building may be replaced with an embedded light source in a composite panel.

Although the illustrative examples are described with respect to a platform, the embedded light source in a composite panel need not be physically attached to a platform. In some illustrative examples, an embedded light source in a composite panel may be used as a portable display or portable lighting. As a result, a user may bring an embedded light source in a composite panel from platform to platform. In some illustrative examples, the embedded light source in the composite panel may be used as a display board, an easel, or other type of display. In some illustrative examples, the embedded light source in a composite panel may be used to form furniture, free-standing lighting fixtures, wired lighting fixtures, or other desirable movable components in a platform.

Figure 2:
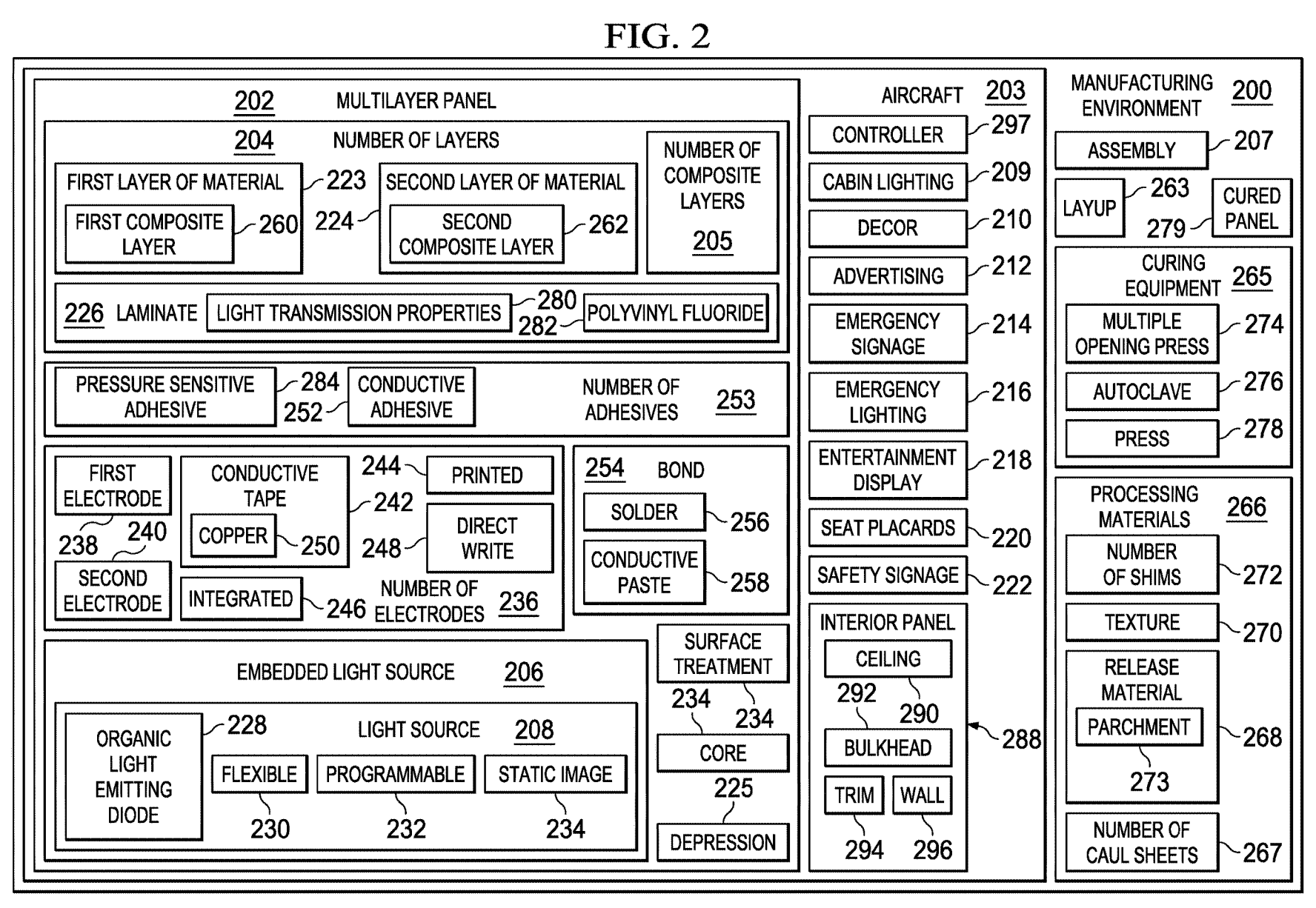

Turning now to FIG. 2, an illustration of a block diagram of a manufacturing environment is depicted in accordance with an illustrative example. Manufacturing environment 200 may be used to manufacture multilayer panel 202 of aircraft 203. Aircraft 100 of FIG. 1 may be a physical implementation of aircraft 203 of FIG. 2.

Multilayer panel 202 includes number of layers 204. In some illustrative examples, number of layers 204 includes number of composite layers 205. Number of composite layers 205 is formed of a number of composite materials.

In these illustrative examples, multilayer panel 202 may also be called a composite panel. Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

Multilayer panel 202 may have any desirable characteristic such as size, shape, flexibility, or other characteristics. Multilayer panel 202 may have any desirable shape. For example, multilayer panel 202 may be portions of aircraft 203 that are substantially planar or have a number of curves or contours. In some illustrative examples, multilayer panel 202 may have a non-planar curvature. Multilayer panel 202 may be rigid or flexible.

Multilayer panel 202 includes embedded light source 206. Multilayer panel 202 with embedded light source 206 may be formed by processing assembly 207. Embedded light source 206 is a structure that emits light. Embedded light source 206 may be any desirable type of light emissive structure. In some illustrative examples, embedded light source 206 may have a number of pixels. Embedded light source 206 may be formed by embedding light source 208 within number of layers 204. Embedded light source 206 may be used for at least one of cabin lighting 209, décor 210, advertising 212, emergency signage 214, emergency lighting 216, entertainment display 218, seat placards 220, safety signage 222, or other desirable types of displays or lighting in aircraft 203.

In illustrative examples in which embedded light source 206 in multilayer panel 202 is used for at least one of cabin lighting 209, emergency lighting 216, or other types of lighting, multilayer panel 202 may be referred to as an embedded lighting panel. In illustrative examples in which embedded light source 206 in multilayer panel 202 is used for at least one of décor 210, advertising 212, emergency signage 214, entertainment display 218, seat placards 220, safety signage 222, or other desirable types of displays multilayer panel 202 may be referred to as an embedded display panel.

Embedded light source 206 may be positioned between first layer of material 223 and second layer of material 224. In some illustrative examples, first layer of material 223 and second layer of material 224 are processed together to form multilayer panel 202. In another illustrative example, embedded light source 206 may be positioned in depression 225 within number of layers 204 and covered with laminate 226. In this illustrative example, second layer of material 224 takes the form of laminate 226 and is adhered to first layer of material 223. In this illustrative example, second layer of material 224 is a laminate layer. In this illustrative example, laminate 226 may not receive the same processing as first layer of material 223.

Laminate 226 may provide desired functionality to multilayer panel 202. For example, laminate 226 may provide a desired aesthetic appearance, UV resistance, fire-worthiness, protection from mechanical damages, chemical protection from chemicals, or other desirable functions to multilayer panel 202. In some illustrative examples, laminate 226 may be a decorative laminate.

In this illustrative example, embedded light source 206 may be described as an inlay. However, embedded light source 206 may not necessarily be completely flush with first layer of material 223.

Embedded light source 206 may take the form of any desired embedded light source. In some illustrative examples, embedded light source 206 may take the form of organic light emitting diode 228. Organic light emitting diode 228 may be at least one of more energy efficient, lighter, or thinner than conventional display assemblies. Further, organic light emitting diode 228 may emit light across substantially the whole surface of organic light emitting diode 228. In other illustrative examples, embedded light source 206 may take the form of electroluminescent (EL) structures, flexible light emitting diodes (LED), or other desirable emissive structures.

Light source 208 may be flexible 230. By being flexible 230, light source 208 may bend and flex with multilayer panel 202. Further, light source 208 may be processed to form multilayer panel 202. In some illustrative examples, light source 208 may be programmable 232. In these examples, light source 208 may be used for multiple purposes. In other examples, light source 208 may display different images for a single purpose. In some illustrative examples, light source 208 may be static image 234. In these examples, light source 208 may be used for a single purpose and may only show a single image.

When light source 208 takes the form of organic light emitting diode 228 and is flexible 230 and programmable 232, it may be referred to as a programmable flexible organic light emitting diode. When light source 208 takes the form of organic light emitting diode 228 and is flexible 230 with static image 234 it may be referred to as a static image flexible organic light emitting diode.

To form multilayer panel 202, number of electrodes 236 may be associated with first layer of material 223. In some illustrative examples, number of electrodes 236 may be associated with first layer of material 223 by positioning number of electrodes 236 relative to first layer of material 223. First electrode 238 may first be associated with first layer of material 223. Second electrode 240 may also be associated with first layer of material 223. At least one of first electrode 238 and second electrode 240 may be adhered to first layer of material 223. In some illustrative examples, at least one of first electrode 238 and second electrode 240 is free to move relative to first layer of material 223. In some illustrative examples, only one of first electrode 238 and second electrode 240 is affixed to first layer of material 223.

In some illustrative examples, by having at least one of first electrode 238 and second electrode 240 free to move relative to first layer of material 223, inconsistencies may be reduced in the resulting multilayer panel 202. For example, by having at least one of first electrode 238 and second electrode 240 free to move relative to first layer of material 223, delamination in multilayer panel 202 may be reduced or prevented.

Number of electrodes 236 may take the form of at least one of conductive tape 242, printed 244, integrated 246, direct write 248, or any other desirable type of electrodes. Conductive tape 242 may be formed of copper 250. When an electrode in number of electrodes 236 is printed 244, it may be formed using a three-dimensional printer or other desirable type of printer. When an electrode in number of electrodes 236 is integrated 246, the electrode may comprise conductive material within a layer of number of layers 204. When an electrode in number of electrodes 236 is conductive tape 242, conductive tape 242 may be associated with first layer of material 223 by conductive adhesive 252 of number of adhesives 253.

Light source 208 is positioned in electrical communication with first electrode 238 and second electrode 240. When light source 208 is in electrical communication with first electrode 238 and second electrode 240, light source 208 is capable of receiving or transmitting electrical signals via at least one of first electrode 238 or second electrode 240. In some illustrative examples, embedded light source 206 may be connected to at least one of first electrode 238 and second electrode 240 by bond 254. Bond 254 may be formed using at least one of solder 256, conductive paste 258, or some other desirable bond.

In some illustrative examples, first layer of material 223 may be first composite layer 260. In some illustrative examples, when first layer of material 223 is first composite layer 260, light source 208 may be positioned in electrical communication with first electrode 238 and second electrode 240 prior to curing first composite layer 260. In these illustrative examples, second layer of material 224 may be second composite layer 262. Second composite layer 262 may be placed over light source 208, first electrode 238, second electrode 240, and first composite layer 260.

Layup 263 may be processed to form all, or part, of multilayer panel 202. Layup 263 may be a stack of an unprocessed number of materials. For example, layup 263 may include number of electrodes 236 and first composite layer 260. As another example, layup 263 may include number of layers 204. In some illustrative examples, layup 263 may include number of layers 204 and embedded light source 206. In some illustrative examples, portions of layup 263 may also receive surface treatment 264. Surface treatment 264 may aid in adhering materials. For example, surface treatment 264 may aid in adhering thermoplastics, thermosets, metals, or other types of materials. Surface treatment 264 may reduce or prevent inconsistencies in the resulting multilayer panel 202. For example, by having surface treatment 264, delamination in multilayer panel 202 may be reduced or prevented. Surface treatment 264 may include at least one of chemical treatment, thermal treatment, mechanical treatment, or any other desirable type of treatment. In some illustrative examples, surface treatment 264 may include at least one of corona treatment, plasma treatment, or flame treatment.

In the above illustrative example, placing second composite layer 262 over light source 208, first electrode 238, second electrode 240, and first composite layer 260 forms layup 263. Afterwards, layup 263 including embedded light source 206, first composite layer 260, and second composite layer 262 are processed to cure first composite layer 260 and second composite layer 262.

Layup 263 may be processed using at least one of curing equipment 265 or processing materials 266. Processing materials 266 may include number of caul sheets 267, release material 268, texture 270, or number of shims 272. Layup 263 may be placed between number of caul sheets 267 and layup 263 may be placed into curing equipment 265. Release material 268 may be positioned between number of caul sheets 267 and layup 263. In some illustrative examples, texture 270 may be positioned between a layer of release material 268 and layup 263. Texture 270 may change the exterior texture of layup 263. In some illustrative examples, release material 268 may be parchment 273. In some illustrative examples, curing equipment 265 may take the form of one of multiple opening press 274, autoclave 276, press 278, or other desirable form of equipment.

In some illustrative examples, number of shims 272 may be positioned within layup 263 prior to curing number of composite layers 205. In some illustrative examples, number of shims 272 may be positioned within processing materials 266 relative to layup 263 prior to curing number of composite layers 205. For example, number of shims 272 may be positioned adjacent to layup 263 within release material 268.

In illustrative examples in which second composite layer 262 is within layup 263, when embedded light source 206 is illuminated, the light travels through second composite layer 262. The light also travels through any additional layers positioned over second composite layer 262. In these illustrative examples, second composite layer 262 has desirable transmission properties such that embedded light source 206 is visible through second composite layer 262 when illuminated.

When embedded light source 206 is processed with number of layers 204, multilayer panel 202 may have a substantially consistent surface. As a result of the substantially consistent surface, embedded light source 206 may not be detected within multilayer panel when embedded light source 206 is not illuminated.

When layup 263 includes embedded light source 206, embedded light source 206 will experience temperatures and pressures applied to number of layers 204 to cure number of composite layers 205. The materials of number of layers 204 may be selected such that processing does not damage embedded light source 206. In some illustrative examples, multilayer panel 202 may be a pre-existing product layup. Multilayer panel 202 may be selected to include embedded light source 206 based on pre-existing processing parameters for the materials of multilayer panel 202.

In some illustrative examples, embedded light source 206 may not be exposed to processing temperatures or pressures. In these illustrative examples, first layer of material 223 of number of layers 204 may be processed prior to incorporating embedded light source 206. For example, number of shims 272 may be placed relative to first composite layer 260 to form layup 263. Afterwards, layup 263 including first composite layer 260 and number of shims 272 is processed to cure first composite layer 260. Curing layup 263 forms cured panel 279. Cured panel 279 has depression 225 formed by number of shims 272.

Light source 208 may then be electrically associated with first electrode 238 and second electrode 240 on cured panel 279. After placing light source 208 in depression 225 in first layer of material 223 and associating light source 208 with first electrode 238 and second electrode 240, laminate 226 may be placed over light source 208 and cured panel 279. Laminate 226 may take the form of second layer of material 224 in this illustrative example. Laminate 226 has light transmission properties 280. When embedded light source 206 is illuminated, the light must travel through laminate 226. In some illustrative examples, laminate 226 may take the form of either a thermoset laminate or a thermoplastic laminate. Laminate 226 may at least one of a resin, reinforcement, or additives. Additives may change at least one of a physical property, an electrical property, a thermal property, or some other desirable property. In some illustrative examples, laminate 226 may include at least one of an epoxy, a phenolic, a polyurethane, a cyanate ester, a melamine, or other desirable type of resin. In some illustrative examples, laminate 226 may take the form of polyvinyl fluoride 282. Laminate 226 may be adhered over embedded light source 206 and cured first composite layer 260 using pressure sensitive adhesive 284 of number of adhesives 253.

In some illustrative examples, number of composite layers 205 may include more than just first composite layer 260 and second composite layer 262. In some illustrative examples, number of composite layers 205 may include three composite layers. In other illustrative examples, number of composite layers 205 may include more than three composite layers.

In some illustrative examples, multilayer panel 202 may also include core 286. Core 286 may be referred to as a layer of core material. In these illustrative examples, number of layers 204 may include core 286. Core 286 may be formed of metal, composite, polymer, or any other desirable material.

In other illustrative examples, multilayer panel 202 may not include core 286. In these illustrative examples, multilayer panel 202 may not be substantially thicker than embedded light source 206 itself. In illustrative examples in which multilayer panel 202 does not contain core 286, multilayer panel 202 may be referred to as a laminate. When multilayer panel 202 does not include core 286, multilayer panel 202 may be adhered to another multilayer panel which does contain a core. For example, multilayer panel 202 with embedded light source 206 may be applied as a laminate over another composite panel.

Multilayer panel 202 may be interior panel 288 of aircraft 203. Interior panel 288 may be any desirable type of panel in the interior of aircraft 203. Interior panel 288 may be part of ceiling 290, bulkhead 292, trim 294, wall 296, or other desirable panels of the interior of aircraft 203.

Multilayer panel 202 may be formed by processing assembly 207. Assembly 207 includes first layer of material 223, first electrode 238, second electrode 240, and embedded light source 206. In some illustrative examples, first layer of material 223 in assembly 207 is cured. In these illustrative examples, assembly 207 may include layup 263 after curing. Assembly 207 may also include other components that were not part of layup 263. In one example, processing assembly 207 may include adhering second layer of material 224 over first layer of material 223. In this example, second layer of material 224 may take the form of laminate 226. In another example, processing assembly 207 may include adhering laminate 226 to assembly 207. In this example, laminate 226 may be adhered over both first layer of material 223 and second layer of material 224, which are already cured.

In other illustrative examples, first layer of material 223 in assembly 207 is uncured. In these illustrative examples, assembly 207 may take the form of layup 263 prior to curing. In these illustrative examples, processing assembly 207 may include curing first layer of material 223 of assembly 207.

Controller 297 may be in communication with light source 208. Controller 297 may control the operation of light source 208. Controller 297 may be implemented in software, hardware, firmware or a combination thereof. When software is used, the operations performed by controller 297 may be implemented in program code configured to run on hardware, such as a processor unit. When firmware is used, the operations performed by controller 297 may be implemented in program code and data and stored in persistent memory to run on a processor unit. When hardware is employed, the hardware may include circuits that operate to perform the operations in controller 297.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In some illustrative examples, controller 297 may be located in a computer system. The computer system includes one or more data processing systems. When more than one data processing system is present, those data processing systems may be in communication with each other using a communications medium such as a network. The data processing systems may be selected from at least one of a computer, a server computer, a tablet, a mobile phone, or some other suitable data processing system.

Figure 3:
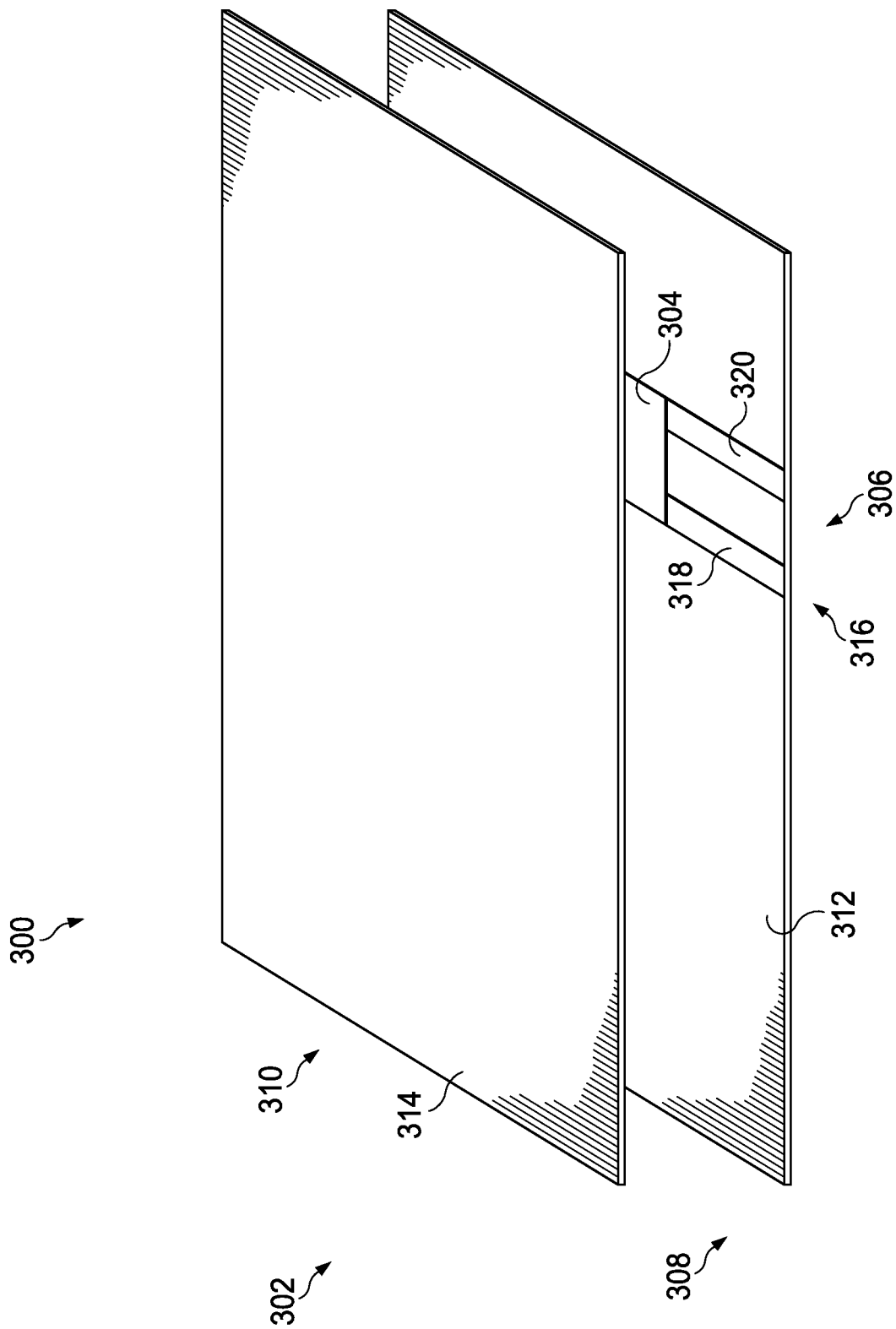
FIG. 3 is an illustration of an exploded view of an embedded light source in accordance with an illustrative example.

Turning now to FIG. 3, an illustration of an exploded view of an embedded light source is depicted in accordance with an illustrative example. In this illustrative example, multilayer panel 300 includes number of layers 302, embedded light source 304, and number of electrodes 306. Multilayer panel 300 may be one physical example of multilayer panel 202 shown in block form in FIG. 2.

Number of layers 302 includes first layer of material 308 and second layer of material 310. In some illustrative examples, first layer of material 308 may be first composite layer 312. In some illustrative examples, second layer of material 310 may be second composite layer 314. When at least one of first layer of material 308 or second layer of material 310 is made of composite, multilayer panel 300 may be referred to as a composite panel.

In some illustrative examples, second layer of material 310 may be a laminate. In these illustrative examples, second layer of material 310 may be adhered over embedded light source 304 using a number of adhesives.

Although, number of layers 302 is shown as only including two layers of material, any additional desirable number of layers may also be in multilayer panel 300. For example, a number of additional layers may be positioned adjacent to first layer of material 308. In some illustrative examples, these additional layers may be integrated into multilayer panel 300 by at least one of co-curing or adhesives. For example, in co-curing, first layer of material 308 and the additional layers may be cured together. In one illustrative example, multilayer panel 300 may be adhered as a decorative laminate over a separate multilayer panel. In another example, a number of additional layers may be positioned adjacent to second layer of material 310. These additional layers may be integrated into multilayer panel 300 by at least one of co-curing or adhesives.

In one illustrative example, a core may be positioned relative to first layer of material 308. This core may be integrated into multilayer panel 300 or may be a component of another multilayer panel.

Number of electrodes 306 is associated with first layer of material 308. In this illustrative example, number of electrodes 306 is formed of conductive tape 316. At least one of first electrode 318 or second electrode 320 may be affixed to first layer of material 308. In some illustrative examples, at least one of first electrode 318 or second electrode 320 is free to move relative to first layer of material 308.

Embedded light source 304 is in electrical communication with first electrode 318 and second electrode 320. In some illustrative examples, embedded light source 304 may be adhered to at least one of first electrode 318 and second electrode 320. In some illustrative examples, embedded light source 304 may be adhered to at least one of first electrode 318 and second electrode 320 using at least one of solder, conductive paste, or other desirable bonds.

Figure 4:
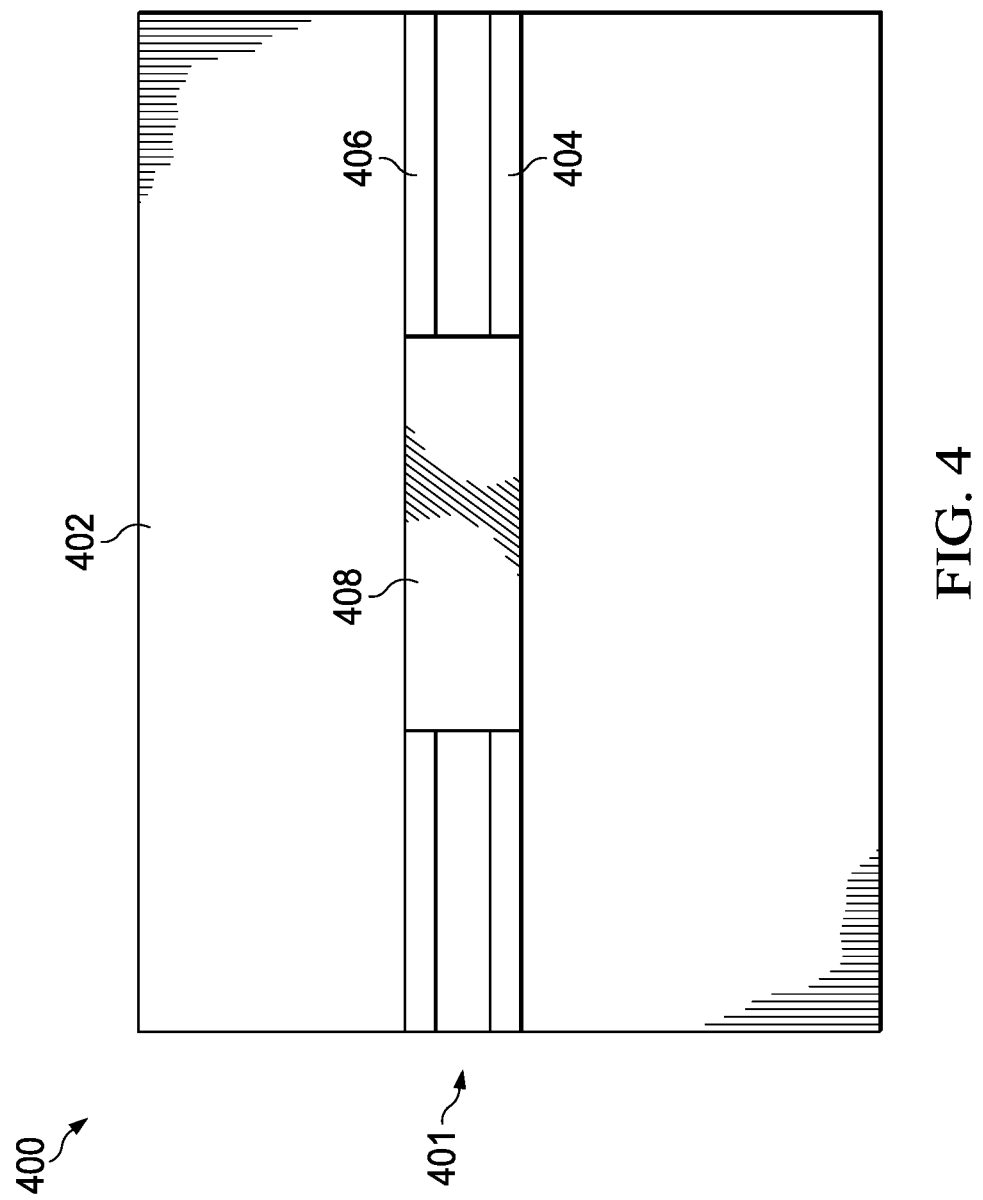
FIG. 4 is an illustration of a shim and a first layer of material in accordance with an illustrative example.

Turning now to FIG. 4, an illustration of a shim and a first layer of material is depicted in accordance with an illustrative example. FIG. 4 may be a top view of a layup during forming of a multilayer panel. Layup 400 includes number of electrodes 401. As depicted, number of electrodes 401 is associated with first layer of material 402. In this illustrative example, number of electrodes 401 includes first electrode 404 and second electrode 406. Shim 408 is positioned relative to, and over, first electrode 404 and second electrode 406. After shim 408 is positioned relative to, and over, first electrode 404 and second electrode 406, layup 400 may be processed. For example, when first layer of material 402 is a composite material, layup 400 may be processed such that first layer of material 402 is cured. During processing, shim 408 may form a depression in layup 400. The size and shape of shim 408 may be selected to form a depression having a desirable size, shape, and depth. Shim 408 may have the approximate thickness of a display to be associated with layup 400 after processing.

Figure 5:
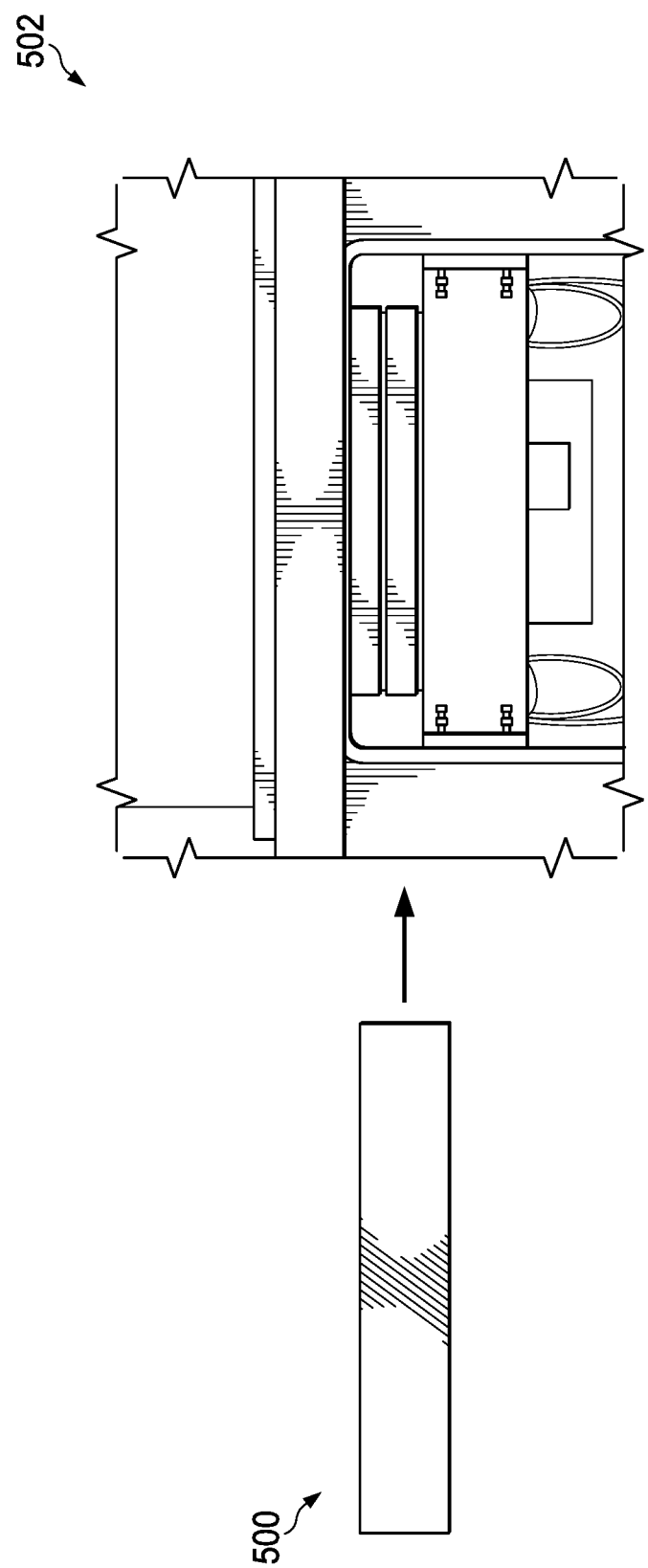
FIG. 5 is an illustration of a layup including a shim being inserted into a press in accordance with an illustrative example.

Turning now to FIG. 5, an illustration of a layup including a shim being inserted into a press is depicted in accordance with an illustrative example. Layup 500 may be layup 400 of FIG. 4. In some illustrative examples, layup 500 may be a different layup, such as a layup having a number of integrated electrodes. Layup 500 includes a shim (not depicted). In some illustrative examples, layup 500 may include processing caul sheets surrounding the number of layers of material to be processed.

Layup 500 may be inserted into press 502. Press 502 may apply a desired pressure and desired temperature to layup 500 to process layup 500. In some illustrative examples, press 502 may apply a desired pressure and desired temperature to cure composite layers in layup 500.

Figure 6:
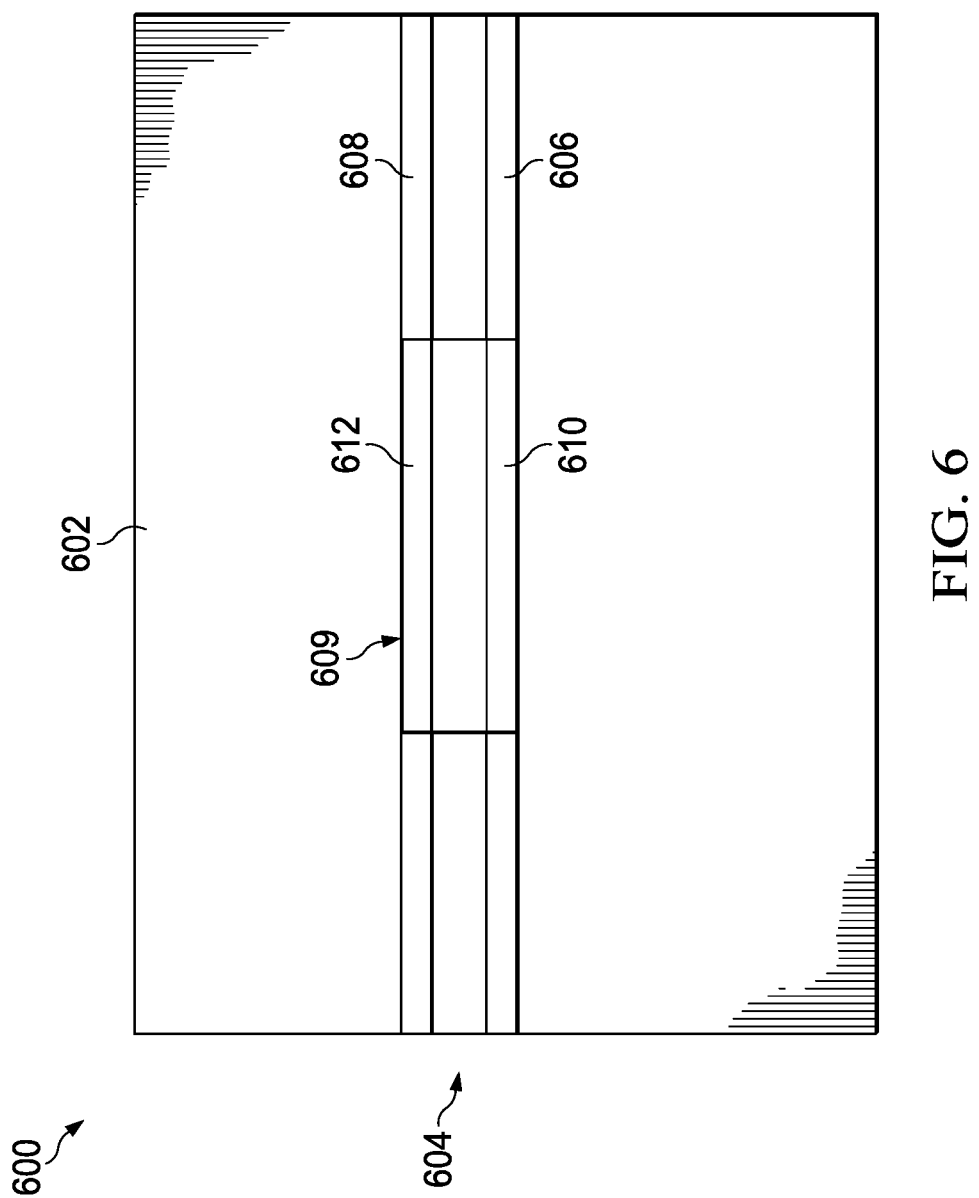
FIG. 6 is an illustration of a cured composite panel with a depression in accordance with an illustrative example.

Turning now to FIG. 6, an illustration of a cured composite panel with a depression is depicted in accordance with an illustrative example. Cured composite panel 600 may be a depiction of layup 400 of FIG. 4 following curing. First layer of material 602 of cured composite panel 600 may be a cured composite material. Number of electrodes 604 of cured composite panel 600 includes first electrode 606 and second electrode 608.

Cured composite panel 600 has depression 609. Depression 609 may be a recessed area of cured composite panel 600. Portion 610 of first electrode 606 may have a lower elevation than the remainder of first electrode 606 outside of depression 609. Portion 612 of second electrode 608 may have a lower elevation than the remainder of second electrode 608 outside of depression 609.

Depression 609 may be formed by placing a shim relative to first layer of material 602 prior to curing cured composite panel 600. After curing, the shim may be removed from cured composite panel 600 to form depression 609. A shim may be selected to form a desirable shape, size, and depth of depression 609. Depression 609 may have a desirable shape, size, and depth for associating a light source with cured composite panel 600 such that the light source is nearly flush or substantially flush with the surface of cured composite panel 600 outside of depression 609.

Figure 7:
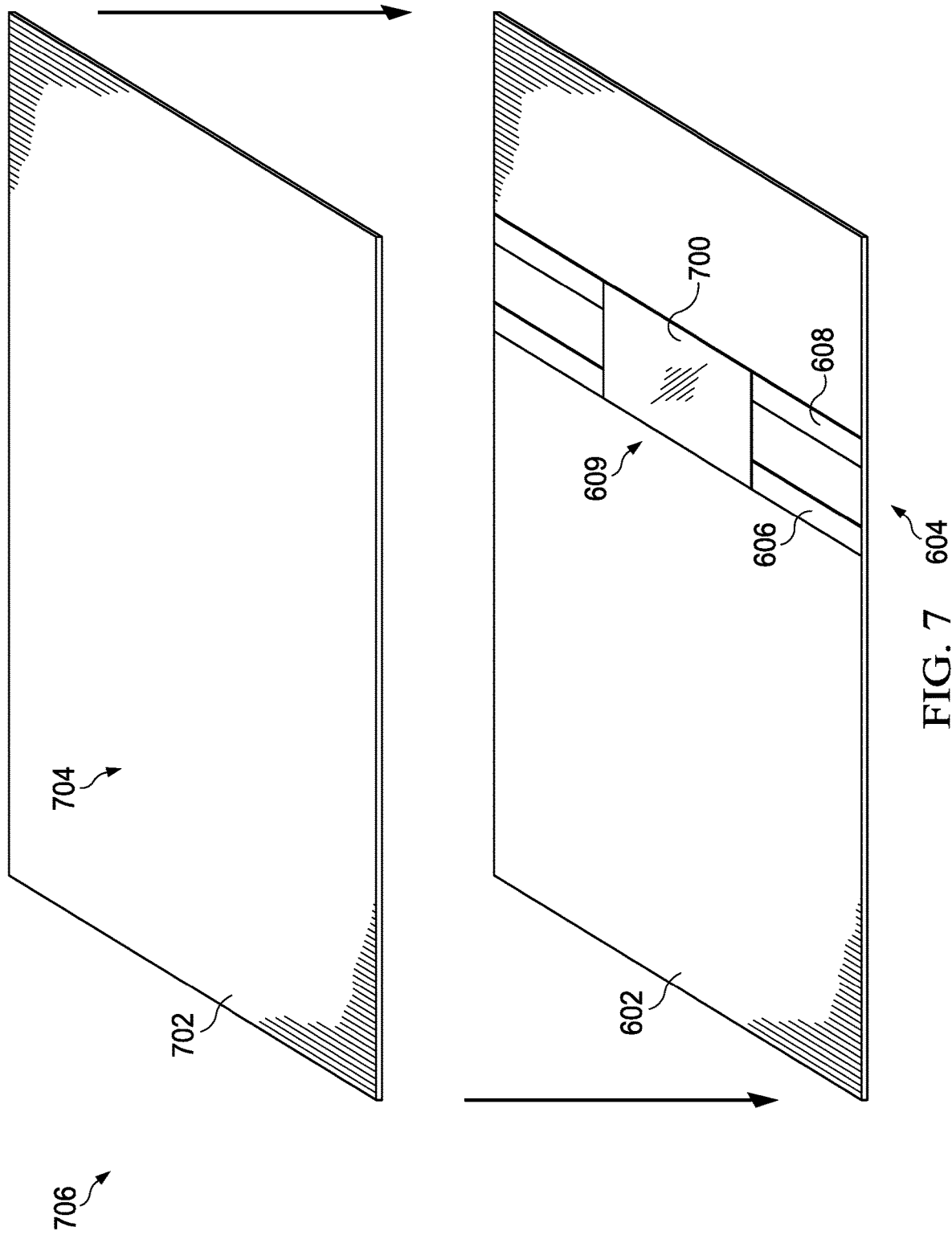
FIG. 7 is an illustration of a light source inserted into a depression in a cured composite panel in accordance with an illustrative example.

Turning now to FIG. 7, an illustration of a light source inserted into a depression in a cured composite panel is depicted in accordance with an illustrative example. As depicted, light source 700 has been inserted in depression 609 of cured composite panel 600 of FIG. 6. Light source 700 is placed in electrical connection with first electrode 606 and second electrode 608. In some illustrative examples, light source 700 may be connected to first electrode 606 and second electrode 608 using a bond such as solder, conductive paste, or any other desirable type of bond.

After associating light source 700 with first electrode 606 and second electrode 608, second layer of material 702 is adhered to first layer of material 602 and light source 700. In some illustrative examples, second layer of material 702 may be laminate 704. Laminate 704 may be adhered to first layer of material 602 and light source 700 using a number of adhesives (not depicted). In some illustrative examples, the number of adhesives (not depicted) may include a pressure sensitive adhesive. By placing laminate 704 over first layer of material 602 and light source 700, cured composite panel 600, light source 700, and laminate 704 form multilayer panel 706.

Figure 8:
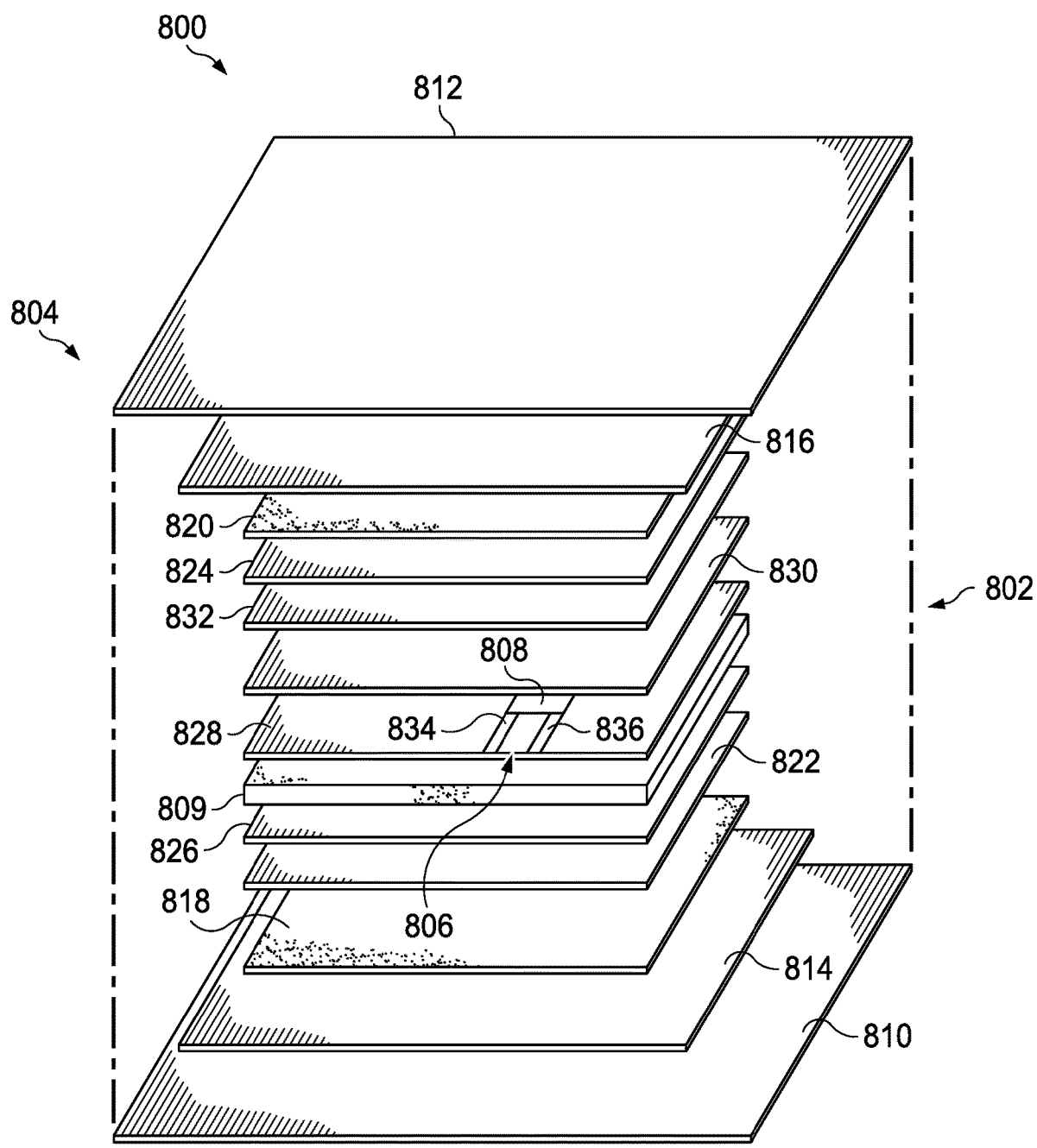
FIG. 8 is an illustration of an exploded view of one implementation of a layup with a light source in accordance with an illustrative example.

Turning now to FIG. 8, an illustration of an exploded view of one implementation of a layup with a light source is depicted in accordance with an illustrative example. Layup 800 may be a physical implementation of layup 263 shown in block form in FIG. 2. After processing, layup 800 will become a multilayer panel, such as multilayer panel 202 of FIG. 2. Layup 800 includes number of layers 802, number of processing materials 804, number of electrodes 806, and light source 808. In this example, number of layers 802 includes core 809. Each of number of layers 802 may be an adhesion promoter, a composite material, a resin, a polymer, a metal, a ceramic, a glass, or other desirable material. In this illustrative example, number of processing materials 804 includes caul sheet 810, caul sheet 812, release material 814, release material 816, texture 818, and texture 820.

Texture 818 and texture 820 may apply a surface finish to layer 822 and layer 824 of number of layers 802. In some illustrative examples, texture 818 and texture 820 may bond to layer 822 and layer 824 to become a portion of the final multilayer panel. Number of layers 802 may also include layer 826, first layer 828, second layer 830, and layer 832. In some illustrative examples, first layer 828 and second layer 830 may each be a composite material. First electrode 834 and second electrode 836 are associated with first layer 828. Light source 808 is in electrical communication with first electrode 834 and second electrode 836.

Figure 9:
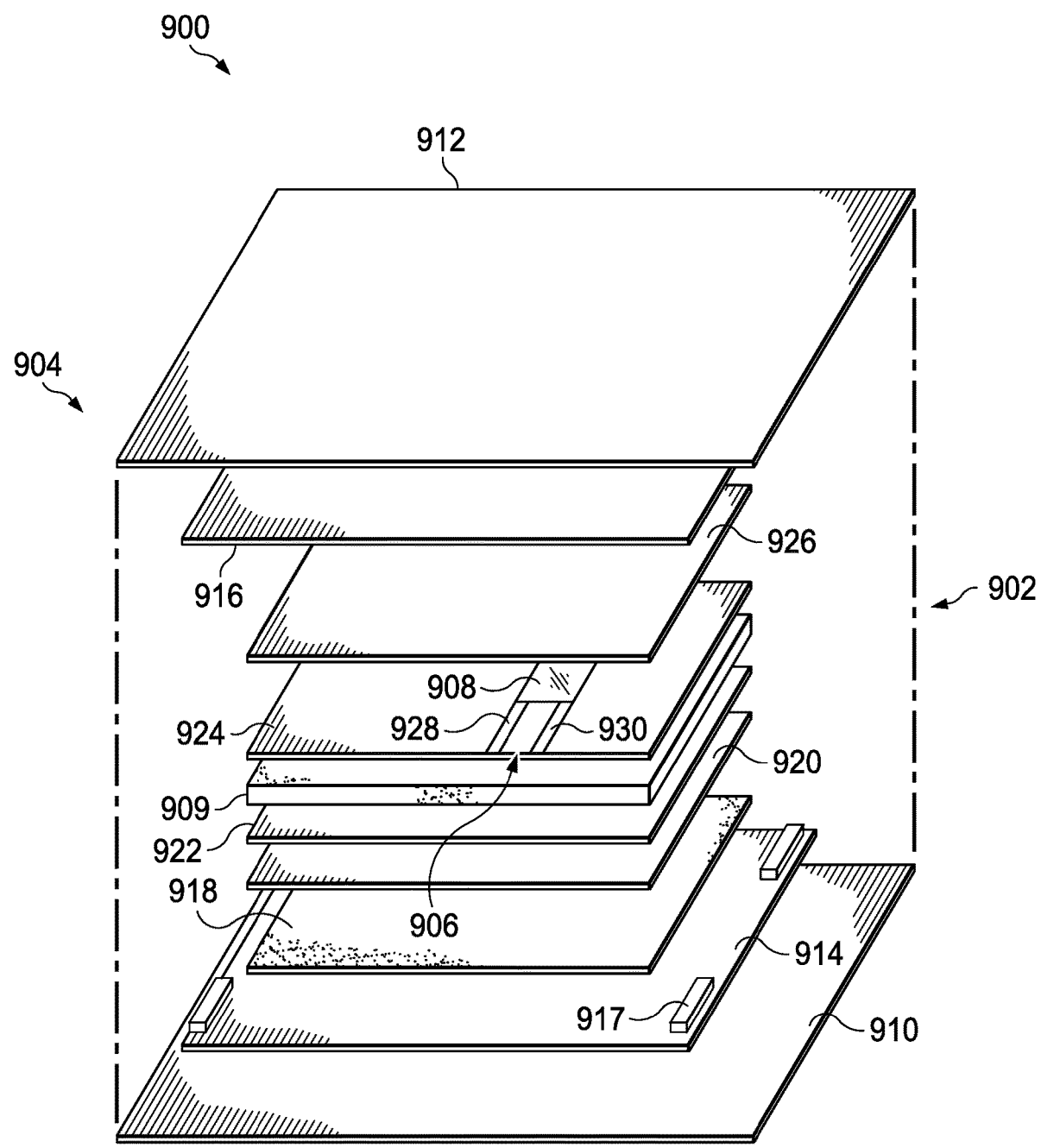
FIG. 9 is an illustration of an exploded view of one implementation of a layup with a light source in accordance with an illustrative example.

Turning now to FIG. 9, an illustration of an exploded view of one implementation of a layup with a light source is depicted in accordance with an illustrative example. Layup 900 may be a physical implementation of layup 263 shown in block form in FIG. 2. After processing, layup 900 will become a multilayer panel, such as multilayer panel 202 of FIG. 2. Layup 900 includes number of layers 902, number of processing materials 904, number of electrodes 906, light source 908, and core 909. Each of number of layers 902 may be a composite material, a resin, a polymer, or other desirable material. In this illustrative example, number of processing materials 904 includes caul sheet 910, caul sheet 912, release material 914, release material 916, number of shims 917, and texture 918. Number of shims 917 may be positioned between release material 914 and release material 916. Number of shims 917 may control a thickness of the resulting multilayer panel following processing of layup 900.

Texture 918 may apply a surface finish to layer 920 of number of layers 902. In some illustrative examples, texture 918 may bond to layer 920 to become a portion of the final multilayer panel. Number of layers 902 may also include layer 922, first layer 924, and second layer 926. In some illustrative examples, first layer 924 and second layer 926 may each be a composite material. First electrode 928 and second electrode 930 are associated with first layer 924. Light source 908 is in electrical communication with first electrode 928 and second electrode 930.

Figure 10:
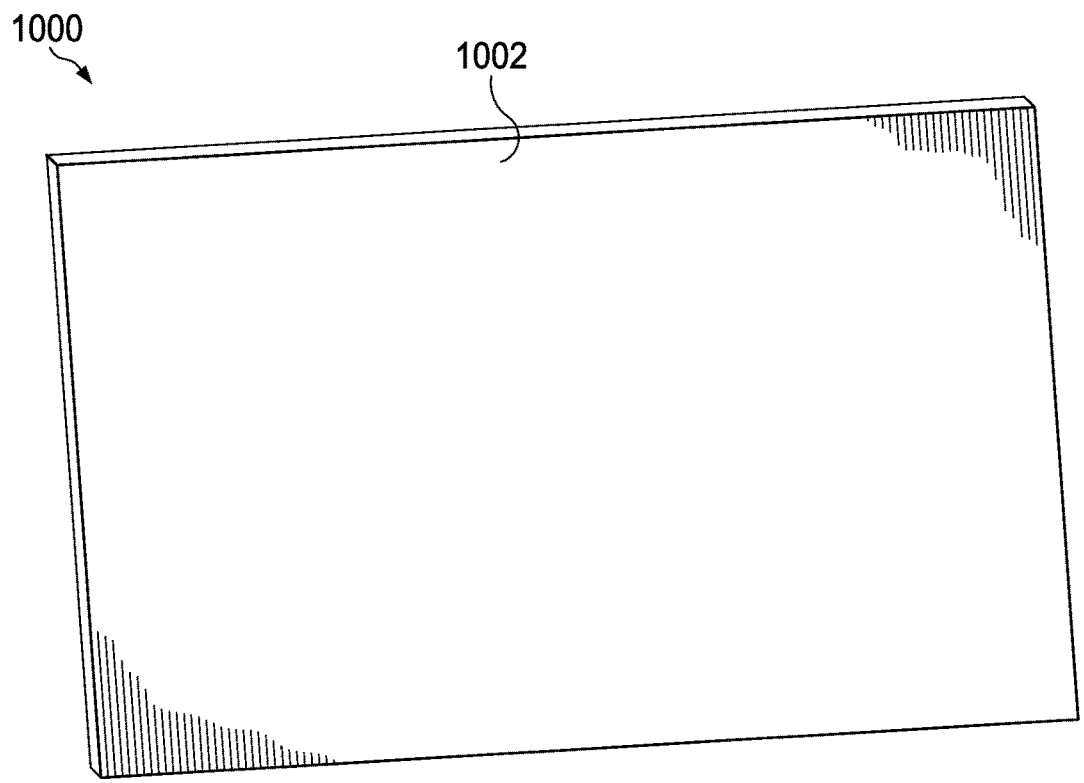
FIG. 10 is an illustration of an embedded light source in a multilayer panel in accordance with an illustrative example.

Turning now to FIG. 10, an illustration of an embedded light source in a multilayer panel is depicted in accordance with an illustrative example. Multilayer panel 1000 may be a physical implementation of multilayer panel 202 shown in block form in FIG. 2. Multilayer panel 1000 may be one of layup 800 or layup 900 after processing.

Multilayer panel 1000 has surface 1002. In this illustrative example, surface 1002 is substantially uniform. As illustrated, the embedded light source (not depicted) is not visible when the embedded light source is not illuminated. As depicted, there is substantially no markoff on surface 1002 from the embedded light source.

In some illustrative examples, multilayer panel 1000 may be an example of multilayer panel 706 after adhering second layer of material 702. In these illustrative examples, surface 1002 may have some amount of markoff. In these illustrative examples, the embedded light source may be identified as a result of this markoff.

Figure 11:
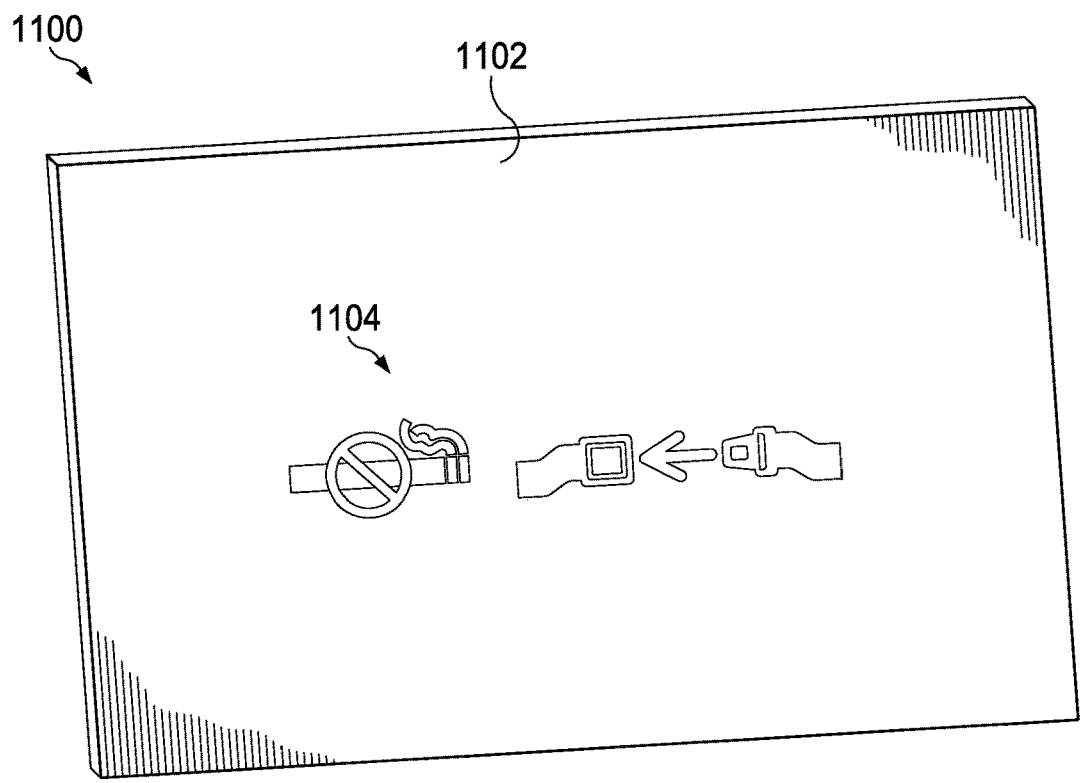
FIG. 11 is an illustration of an illuminated embedded light source in a multilayer panel in accordance with an illustrative example.

Turning now to FIG. 11, an illustration of an illuminated embedded light source in a multilayer panel is depicted in accordance with an illustrative example. View 1100 may be a view of multilayer panel 1000 of FIG. 10 when the embedded light source is illuminated. As can be seen in view 1100, light from the embedded light source shines through surface 1102. In some illustrative examples, the embedded light source may be a dynamic display. In these illustrative examples, image 1104 may change as desired. In other illustrative examples, the embedded light source may be a static display. In these illustrative examples, image 1104 may be the same each time the embedded light source is illuminated.

Although image 1104 is depicted as a fasten seat belt image, image 1104 may take any desirable form. Further, image 1104 as depicted does not limit the use of multilayer panel 1000 to implementations in an aircraft. Multilayer panel 1000 need not be present in an aircraft. Multilayer panel 1000 may be present in any desirable type of platform such as a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, and other suitable platforms.

In some illustrative examples, multilayer panel 1000 may be a standalone product. Multilayer panel 1000 may be a display panel which may be transported from location to location by an operator. Multilayer panel 1000 may be a component of any desirable mobile platform, stationary platform, or any desirable type of structure. For example, multilayer panel 1000 may be a component of a display board, an easel, or other type of display. In some illustrative examples, multilayer panel 1000 may be used to form furniture, free-standing lighting fixtures, wired lighting fixtures, or other desirable movable components.

In some illustrative examples, multilayer panel 1000 may be a component of a school, a hospital, a museum, an exhibition hall, or any other desirable type of building. For example, multilayer panel 1000 may be used for a display or lighting. When not in use, the embedded light source may not be detectable. As a result, multilayer panel 1000 may be used to form walls, ceilings, partitions, or any desirable portion of a building.

Multilayer panel 1000 may be manufactured as an original component of a platform. In some illustrative examples, multilayer panel 1000 may be a replacement or retrofitted component of a platform. For example, a composite panel in aircraft 100 without an embedded light source may be replaced with multilayer panel 1000. In some illustrative examples, all or a portion of a wall of a building may be replaced with multilayer panel 1000.

Yet further, multilayer panel 1000 does not limit the size or shape of potential implementations of multilayer panel 1000. Multilayer panel 1000 may be created in any desirable size or shape.

Figure 12:
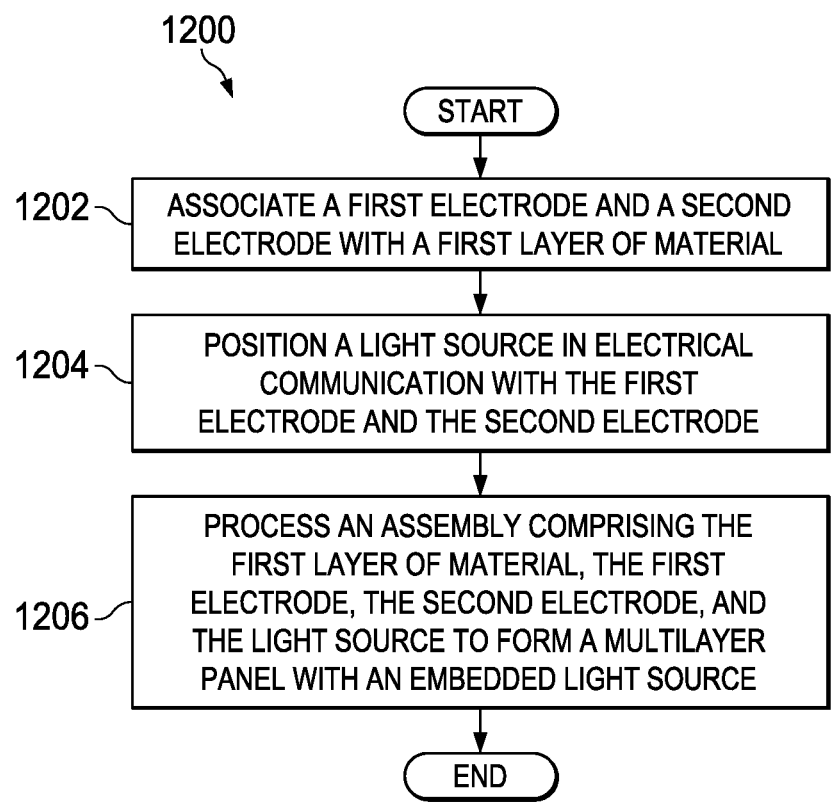
FIG. 12 is an illustration of a flowchart of a process for forming a multilayer panel with an embedded light source in accordance with an illustrative example.

Turning now to FIG. 12, an illustration of a flowchart of a process for forming a multilayer panel with an embedded light source is depicted in accordance with an illustrative example. Process 1200 may be used in manufacturing environment 200 of FIG. 2 to form a multilayer panel with an embedded light source such as multilayer panel 202 with embedded light source 206 of FIG. 2.

The process begins by associating a first electrode and a second electrode with a first layer of material (operation 1202). In some illustrative examples, associating the first electrode and the second electrode with the first layer of material includes affixing only one of the first electrode or the second electrode to the first layer of material. Affixing only one of the first electrode or the second electrode to the first layer of the material comprises at least one of adhering the only one of the first electrode or the second electrode to the first layer of material, printing the only one of the first electrode or the second electrode onto the first layer of material, or integrating conductive fibers into the first layer of material at selective locations to form the only one of the first electrode or the second electrode.

By affixing only one of the first electrode or the second electrode, inconsistencies may be reduced in the resulting multilayer panel. For example, by having only one of the first electrode and the second electrode affixed to the first layer of material, delamination in the multilayer panel may be reduced or prevented. In some illustrative examples, associating also includes positioning the other of the first electrode or the second electrode such that the other of the first electrode or the second electrode is free to move relative to the first layer of material.

The process then positions a light source in electrical communication with the first electrode and the second electrode (operation 1204). In some illustrative examples, positioning the light source in electrical communication with the first electrode and the second electrode includes bonding the light source to at least one of the first electrode or the second electrode. Bonding may include at least one of solder or conductive paste.

The process may then process an assembly comprising the first layer of material, the first electrode, the second electrode, and the light source to form a multilayer panel with an embedded light source (operation 1206). Afterwards the process terminates.

In some illustrative examples, processing the assembly may include curing the first layer of material. In some illustrative examples, processing the assembly may include applying a laminate over the first layer of material and the light source. In some illustrative examples, the multilayer panel with embedded light source formed comprises at least one of cabin lighting, décor, advertising, emergency signage, emergency lighting, entertainment display, seat placards, or safety signage in an aircraft.

The flowcharts and block diagrams in the different depicted examples illustrate the architecture, functionality, and operation of some possible implementations of apparatuses and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the process may further include applying a surface treatment to at least one of the light source or the first layer prior to processing the assembly panel. As another example, the process may further include placing a second layer of material over the light source and the first layer of material. In some illustrative examples, the first layer of material and the second layer of material are pre-impregnated composite materials, and processing the assembly comprises curing the assembly with at least one of applied heat or applied pressure to form a cured panel.

In some illustrative examples, the second layer of material comprises a material that allows at least some light from the light source to travel through the second layer of material. In some illustrative examples, processing the assembly further comprises applying a laminate over the cured panel.

In another example, the process may further include curing the first layer of material to form a cured panel after associating the first electrode and the second electrode with the first layer of material, wherein the light source is positioned in electrical communication with the first electrode and the second electrode on the cured panel, and wherein processing the multilayer panel comprises applying a laminate over the light source and the cured panel to form the multilayer panel with the embedded light source.

In one example, the process further includes associating a shim having the approximate thickness of the light source with the first layer of material. The shim may be used to form a depression during processing of the multilayer panel.

Figure 13:
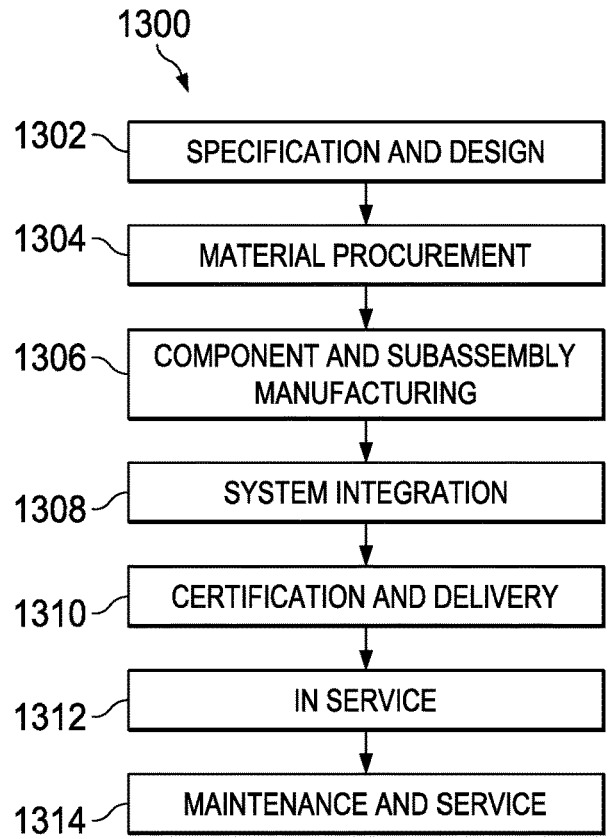
FIG. 13 is an illustration of a block diagram of an aircraft manufacturing and service method in accordance with an illustrative example.

The illustrative examples of the disclosure may be described in the context of aircraft manufacturing and service method 1300 as shown in FIG. 13 and aircraft 1400 as shown in FIG. 14. Turning first to FIG. 13, a block diagram of an aircraft manufacturing and service method is depicted in accordance with an illustrative example. During pre-production, aircraft manufacturing and service method 1300 may include specification and design 1302 of aircraft 1400 of FIG. 14 and material procurement 1304.

During production, component and subassembly manufacturing 1306 and system integration 1308 of aircraft 1400 of FIG. 14 takes place. Thereafter, aircraft 1400 of FIG. 14 may go through certification and delivery 1310 in order to be placed in service 1312. While in service 1312 by a customer, aircraft 1400 of FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, a block diagram of an aircraft is depicted in which an illustrative example may be implemented. In this example, aircraft 1400 is produced by aircraft manufacturing and service method 1300 of FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative examples may be applied to other industries, such as the automotive industry. Apparatuses and methods embodied herein may be employed during at least one of the stages of aircraft manufacturing and service method 1300 of FIG. 13.

One or more illustrative examples may be used during manufacturing and service method 1300 of FIG. 13. For example, multilayer panel 202 having embedded light source 206 of FIG. 2 may be formed during component and subassembly manufacturing 1306. Further, multilayer panel 202 having embedded light source 206 of FIG. 2 may be inserted to replace a display in an aircraft during maintenance and service 1314.

The illustrative examples present methods of forming embedded light sources in multilayer panels. By embedding a light source, such as an organic light emitting diode, in a composite panel, at least one of weight, bulk, or connection complexity may be decreased for pre-existing display locations. For example, brackets and mounting equipment may not be used with embedded light sources in multilayer panels. By eliminating brackets and mounting equipment in select locations, the weight of an aircraft may be reduced. Reduction in aircraft weight may contribute to a reduction in costs.

Further, embedded light sources in multilayer panels may be used instead of conventionally unilluminated displays in some areas. Yet further, the number of displays in an aircraft may be reduced if embedded light sources are programmable displays. For example, the number of displays in an aircraft may be reduced if embedded light sources are capable of displaying multiple images in individual conventional displays.

By embedding light sources into multilayer panels, the number of manufacturing steps in an aircraft may be reduced. For example, holes to install brackets and mounting equipment for displays may not be used. As a result, these manufacturing steps may be eliminated. By eliminating or reducing steps of manufacturing, at least one of manufacturing time or manufacturing cost may also be reduced.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A multilayer panel with an embedded light source comprising:
   a first layer of composite material;
   a second layer of composite material;
   a first electrode associated with the first layer of composite material and positioned between the first layer of composite material and the second layer of composite material;
   a second electrode associated with the first layer of composite material and positioned between the first layer of composite material and the second layer of composite material;
   a depression formed in the first layer of composite material, wherein the first electrode and the second electrode each continuously extend from a first edge of the first layer of composite material, through the depression, and to a second edge of the first layer of composite material;
   a light source in electrical communication with the first electrode and the second electrode, wherein the light source is positioned on the first electrode and the second electrode within the depression; and
   the second layer of material overlying the first layer of composite material, the light source, and a portion of the first layer of composite material extending beyond the depression;
   wherein the first electrode or the second electrode is free to move relative to the first layer of composite material.

2. The multilayer panel of claim 1, wherein the second layer of material is a laminate layer and wherein the light source is not detectable within the multilayer panel when the light source is not illuminated.

3. The multilayer panel of claim 1 further comprising:
   a conductive adhesive positioned between at least one of the first electrode or the second electrode and the light source.

4. The multilayer panel of claim 1 further comprising:
   a layer of core material.

5. The multilayer panel of claim 1, wherein the second layer is a pre-impregnated composite material.

6. The multilayer panel of claim 1, wherein the multilayer panel has a non-planar curvature.

7. The multilayer panel of claim 1, wherein the light source is a static image flexible organic light emitting diode.

8. The multilayer panel of claim 1, wherein the light source is a programmable flexible organic light emitting diode.

9. The multilayer panel of claim 1, wherein the multilayer panel comprises a display or lighting in an aircraft.

10. The multilayer panel of claim 9, wherein the multilayer panel comprises at least one of cabin lighting, décor, advertising, emergency signage, emergency lighting, entertainment display, seat placards, or safety signage.

11. The multilayer panel of claim 1, wherein the first electrode and the second electrode each have a portion positioned within the depression and another portion extending outside of the depression.

12. The multilayer panel of claim 1, wherein a portion of the first electrode positioned within the depression has an elevation different from another portion of the first electrode outside of the depression.

13. The multilayer panel of claim 1, wherein the first electrode or the second electrode is formed of conductive tape affixed to the first layer of composite material.

14. The multilayer panel of claim 1, wherein the first electrode or the second electrode is formed of conductive material integrated within the first layer of composite material.

15. The multilayer panel of claim 1, wherein a size, a shape, and a thickness of the depression corresponds to a size, a shape, and a thickness of the light source such that the light source fills the depression and is flush with a surface of the first composite layer outside of the depression.

16. An aircraft comprising:
   a multilayer panel with an embedded light source comprising a first electrode associated with a first layer of composite material, a second electrode associated with the first layer of composite material, a depression formed in the first layer of composite material, wherein the first electrode and the second electrode each continuously extend from a first edge of the first layer of composite material, through the depression, and to a second edge of the first layer of composite material, wherein the first electrode or the second electrode is free to move relative to the first layer of composite material, a light source in electrical communication with the first electrode and the second electrode and positioned on the first electrode and the second electrode within the depression, and a second layer of material overlying the first layer of composite material, the light source, and a portion of the first layer of composite material extending beyond the depression; and
   a controller in communication with the light source.

17. The aircraft of claim 16, wherein the multilayer panel comprises at least one of cabin lighting, décor, advertising, emergency signage, emergency lighting, entertainment display, seat placards, or safety signage.

18. A multilayer panel with an embedded light source comprising:
   a first layer of composite material;
   a depression formed in the first layer of composite material;
   a light source positioned on a first electrode and a second electrode within the depression and relative to the first layer of composite material, wherein the first electrode and the second electrode each continuously extend from a first edge of the first layer of composite material, through the depression, and to a second edge of the first layer of composite material opposite the first edge of the first layer of composite material; and
   a second layer of composite material overlying the first layer of composite material, the light source, and a portion of the first layer of composite material extending beyond the depression;
   wherein the first electrode or the second electrode is free to move relative to the first layer of composite material.

19. The multilayer panel of claim 18, wherein the multilayer panel comprises a display or lighting in an aircraft.

20. The multilayer panel of claim 19, wherein the multilayer panel comprises at least one of cabin lighting, décor, advertising, emergency signage, emergency lighting, entertainment display, seat placards, or safety signage.

21. The multilayer panel of claim 18, wherein the first electrode and the second electrode each have a portion positioned within the depression and another portion extending outside of the depression.

* * * * *